United States Patent
Kinser et al.

(10) Patent No.: US 8,069,476 B2
(45) Date of Patent: Nov. 29, 2011

(54) IDENTITY VALIDATION

(75) Inventors: Stephen Hugh Kinser, Saratoga Springs, UT (US); Lloyd Leon Burch, Payson, UT (US); Cameron Craig Morris, Saratoga Springs, UT (US)

(73) Assignee: Novell, Inc., Provo, UT (US)

( * ) Notice: Subject to any disclaimer, the term of this patent is extended or adjusted under 35 U.S.C. 154(b) by 976 days.

(21) Appl. No.: 11/444,945

(22) Filed: Jun. 1, 2006

(65) Prior Publication Data
US 2007/0283424 A1    Dec. 6, 2007

(51) Int. Cl.
*G06F 7/04* (2006.01)
*H04L 9/06* (2006.01)

(52) U.S. Cl. .......... 726/8; 726/5; 726/6; 726/12; 726/10
(58) Field of Classification Search .............. 726/5, 6, 726/8, 10, 12
See application file for complete search history.

(56) References Cited

U.S. PATENT DOCUMENTS

| | | |
|---|---|---|
| 5,537,102 A | 7/1996 | Pinnow |
| 6,199,761 B1 | 3/2001 | Drexler |
| 6,338,140 B1 | 1/2002 | Owens et al. |
| 7,027,432 B2 | 4/2006 | Carolan et al. |
| 2003/0177366 A1 | 9/2003 | de Jong |
| 2004/0128392 A1* | 7/2004 | Blakley et al. ............... 709/229 |
| 2004/0128546 A1* | 7/2004 | Blakley et al. ............... 713/201 |
| 2005/0114701 A1 | 5/2005 | Atkins et al. |
| 2005/0188212 A1 | 8/2005 | Laferriere et al. |
| 2006/0021010 A1 | 1/2006 | Atkins et al. |
| 2007/0130025 A1* | 6/2007 | Nakajima ...................... 705/26 |
| 2007/0143829 A1* | 6/2007 | Hinton et al. ................... 726/5 |

OTHER PUBLICATIONS

Proxy server. (2003). In Webster's New World™ Computer Dictionary. Hoboken, NJ: Wiley. http://www.credoreference.com/entry/webstercom/proxy_server.*

* cited by examiner

Primary Examiner — Kambiz Zand
Assistant Examiner — Imhotep Durham
(74) Attorney, Agent, or Firm — Schwegman, Lundberg & Woessner, P.A.

(57) ABSTRACT

Techniques for validating identities are provided. A sign-on request is authenticated for a given principal. Attributes associated with that principal are acquired from an identity service and compared against local maintained attributes for that principal. If the identity-service acquired attributes match the local attributes, then the principal is validated for access. During principal access, selective events drive updates to the identity-service acquired attributes, and the comparison with the local attributes is performed again to determine whether the validated principal is to be invalidated or is to remain validated.

8 Claims, 3 Drawing Sheets

IDENTITY VALIDATION

FIELD

The invention relates generally to security and more particularly to techniques for validating an identity.

BACKGROUND

Commerce and affairs are increasingly being transacted over the Internet. That is, enterprises and individual users now have sufficient infrastructure and software services to conduct secure and insecure transactions.

One downside to this environment is that a single user often needs to have a plethora of identities for the variety of services and resources that the user consumes over the Internet. This can become a challenging and daunting situation and may often result in the user consuming less resources when that user forgets or mismanages his/her identities.

To solve this problem, a variety of single sign-on services have been offered to users over the Internet. Essentially, a user can sign-on to such a service and then access all the other services associated with the user; assuming those other services are registered with the single sign-on service. In this manner, the user does not have to manage each available service, which the user may need to supply credentials to for purposes of gaining access.

However, these single sign-on services still do not ensure user security when an intruder intercepts or acquires a particular credential of the user for a particular service. So, the user can still be exposed with each individual service being managed by a single sign-on service. Moreover, if an intruder gains the credentials necessary to access the single sign-on service, then every service of the user is exposed and vulnerable. This latter situation can be devastating to a user.

It is also worth noting that some user identities are associated with enterprises for which they work or are otherwise employed. Such users may also have access to services and resources, which if acquired by competitors or criminals could be extremely harmful to their enterprises.

Therefore, it is advantageous to provide techniques for regularly validating identities.

SUMMARY

In various embodiments, techniques for validating identities are presented. More specifically, and in an embodiment, a method for validating a principal's true identity is provided. Initially, a sign-on token is received from a principal. Next, first principal attributes are requested from an identity service and second principal attributes are independently acquired. Finally, the principal is validated for access when the first principal attributes match the second principal attributes.

DETAILED DESCRIPTION

Figure 1:
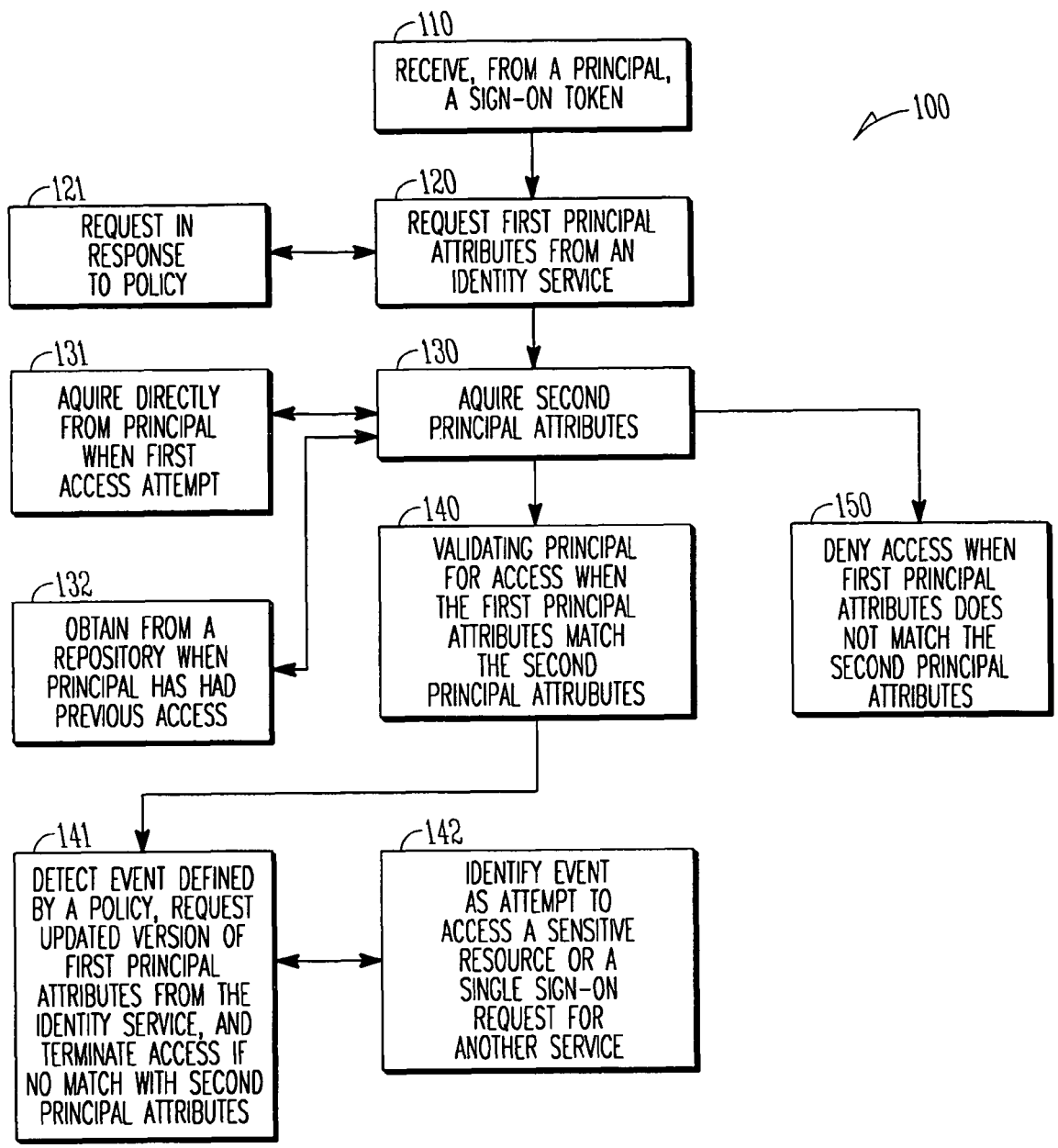
FIG. 1 is a diagram of a method for validating an identity for a principal, according to an example embodiment.

As used herein a "service" is a type of resource that is accessible over a network. The service is implemented as instructions that when loaded and accessed by a machine performs one or more functions that the service is advertised to perform. A "principal" is another type of resource that may be an automated service, or may logically represent a physical resource within an electronic environment, such as, but not limited to, a user, a device, a group of users, a group of devices, an object, etc.

An "identity service" refers to a special type of service that is designed to manage and supply authentication services and authentication information for principals and for other services. So, an identity service may authenticate a given principal for access to a variety of local and external services being managed by that identity service. A single principal may have multiple identity services.

According to an embodiment, some example identity services are described in "Techniques for Dynamically Establishing and Managing Authentication and Trust Relationships," filed on Jan. 27, 2004, and having the U.S. Ser. No. 10/765,523; "Techniques for Establishing and Managing a Distributed Credential Store," filed on Jan. 29, 2004, and having the U.S. Ser. No. 10/767,884; and "Techniques for Establishing and Managing Trust Relationships," filed on Feb. 3, 2004, and having the U.S. Ser. No. 10/770,677; all of which are commonly assigned to Novell, Inc., of Provo, Utah and the disclosures of which are incorporated by reference herein.

An identity service may also provide single sign-on services to a principal. That is, a principal may sign-on to an identity service and acquire identities and credentials to access a variety of other services.

A principal is recognized via an "identity." An identity is authenticated via various techniques (e.g., challenge and response interaction, cookies, assertions, etc.) that use various identifying information (e.g., identifiers with passwords, biometric data, digital certificates, digital signatures, etc.). A "true identity" is one that is unique to a principal across any context that the principal may engage in over a network (e.g., Internet, Intranet, etc.). However, each principal may have and manage a variety of identities, where each of these identities may only be unique within a given context (given service interaction).

As used herein "attributes" may be viewed as types of identifying information, such as, but not limited to, birth date, mother's maiden name, pet's name, last transaction for a given context, age, employment, income level, social-security number (SSN), etc.

The true identity of a principal is typically managed and controlled by an identity service, such as the ones enumerated above. The identity service may also manage the principal's other identities that the principal uses with services for which the principal interacts in a variety of different contexts.

A service provider (hereinafter "SP") is a service that a principal interacts with in a given context. For example, a SP may be a principal's corporate network connection. The corporate network connection may also be used by the principal to access local services within a secure environment of the corporation and external services that reside outside the environment of the corporation. A service may also be any Internet-accessible or World-Wide Web (WWW) service accessible to the principal. For example, a SP can be a banking service, an auction service, a store's service, a search service, an electronic mail (email) service, and others.

In this manner, some SP's may provide federated identity services for sub services that they trust or securely communicate with. For example, eBay® is an online auctioning service where a user (principal) can authenticate to eBay® via the WWW to acquire an eBay®-specific identity. Once signed into eBay® (i.e., SP-specific context), the user can access other services, where the user may have a different identity, such as PayPal®.

According to an embodiment, a principal signs into an identity service to acquire a sign-on token. This token is presented to a desired SP for which the principal wants to gain access. The SP authenticates the principal in response to the token. If this is a first time that the principal accessed the SP, then the principal supplies attributes to the SP and the SP retains these attributes. The types or categories of attributes may be driven by policy. The SP also acquires a second set of attributes directly from the identity service for that principal. Again, the types and categories of second attributes may be driven by policy. The SP compares the principal-acquired attributes against the identity-service acquired attributes and if they match, the principal is validated for access, if they do not match; the principal's access is terminated.

Various embodiments of this invention can be implemented in existing network architectures. In some cases, the techniques presented herein may be implemented as enhancements to existing services. These enhancements may be integrated into the existing services or accessed externally via Application Programming Interfaces (API's). In some cases, the enhancements may be unknown to the existing services, such that the existing services are not even aware of the techniques being processed. This can occur when the techniques are implemented as a transparent proxy on behalf of the services. According to the techniques presented herein are implemented in whole or in part in the Novell® network and proxy server products, email products, identity service products, operating system products, and/or directory services products distributed by Novell®, Inc., of Provo, Utah.

Of course, the embodiments of the invention can be implemented in a variety of architectural platforms, operating and server systems, or applications. Any particular architectural layout or implementation presented herein is provided for purposes of illustration and comprehension only and is not intended to limit aspects of the invention.

FIG. 1 is a diagram of a method 100 for validating an identity for a principal, according to an example embodiment. The method 100 (hereinafter "validation service") is implemented in a machine-accessible and readable medium. The validation service is operational over and processes within a network. The network may be wired, wireless, or a combination of wired and wireless.

At 110, a sign-on token is received from a principal. The sign-on token represents a credential from the principal being presented to the validation service for purposes of gaining access to the validation service and its features or other services trusted by the validation service. According to an embodiment, the sign-on token may be an assertion in a Security Assertion Markup Language (SAML) or Liberty Alliance format.

In an embodiment, the principal initially interacts with an identity service and authenticates to that identity service. The principal then requests an identity that is recognized by the validation service and the identity service supplies the sign-on token. The principal then presents this sign-on token to the validation service for purposes of gaining access to the resources of the validation service.

In some cases, after the sign-on token is received the validation service may, according to policy, engage in a challenge-response dialogue with the principal to further authenticate the principal. For example, the principal may be asked to supply a password.

At 120, the validation service requests first principal attributes from an identity service. The validation service and the identity service are in trusted relationships and communicate with one another in a secure manner. According to an embodiment, at 121, the validation service identifies the specific attributes or types of attributes to request from the identity service in response to a policy. Attributes, as defined above, include identifying information about the principal. The first principal attributes are maintained, managed, and supplied by the identity service and the validation service receives the first principal attributes directly from the identity service.

At 130, the validation service acquires second principal attributes. The second principal attributes are managed and controlled by the validation service. According to an embodiment, at 131, the second principal attributes are acquired directly from the principal during a first access attempt. That is, if the principal has never before interacted with the validation service, then the validation service engages the principal to obtain values for the desired second principal attributes.

In another embodiment, at 132, the validation service obtains the second principal attributes from a repository in response to an identity associated with the principal. So, if the principal has previously interacted with the validation service, then the second principal attributes are retrieved by the validation service within a local environment of the validation service.

The second principal attributes are not acquired from the identity service; they are independently maintained and controlled by the validation service.

As an example, consider a user (principal) that accesses an identity service to acquire an identity and credentials (sign-on token) to access eBay®. eBay® includes a front end service that interacts with the validation service. The validation service first determines if the credentials are sufficient for access. Next, the validation service contacts the identity service and acquires the user's mother's maiden name and birth date (first principal attributes). If the user has not yet ever accessed eBay®, then the validation service engages the user to acquire values for the user's mother's maiden name and birth date (second principal attributes). If the user has accessed eBay®, then the validation service acquires values for the user's mother's maiden name and birth date from a repository.

At 140, the validation service validates the principal when the first principal attributes match the second principal attributes. So, in the prior example the validation service will validate the eBay® user for access to eBay® if the identity-service supplied values for the user's mother's maiden name and birth date match the validation-service acquired values for the user's mother's maiden name and birth date. Not all the attributes have to be compared with one another. In fact, policy may drive selective comparisons with respect to the attributes.

The fact that the validation service performs an independent assessment of the principal even when the principal is authenticated for access pursuant to the sign-on token provides additional security for a principal. Thus, if a user's identity is compromised and access is attempted to the validation service, the validation service supplies added validation on the identity presented to ensure the principal is legitimate.

According to an embodiment, at 141, the validation service may also monitor the access session of the principal once access is granted. This can be done by detecting events that are raised or trapped during the session with the principal. Again, the events may be defined by policy. When such an event is detected during a session with the principal, the validation service updates the first principal attributes by consulting the identity service again for updated values. The updated version of the first principal attributes can then be compared to the second principal attributes to ensure access is still acceptable to the validation service. In this manner, the validation can be regular or continuous during a session with the principal.

In some cases, at 142, the validation service may identify some events as an attempt by the principal to access a sensitive, restricted, or regulated resource. The validation service may also detect a situation where the principal is attempting to perform a single sign-on request or operation on another service, which is trusted and which communicates with the validation service. These types of events are cases where the validation service may want to perform updates on the first principal attributes in a real-time, dynamic, and on-demand fashion.

At 150, the validation service denies access when the first principal attributes do not match the second principal attributes.

Figure 2:
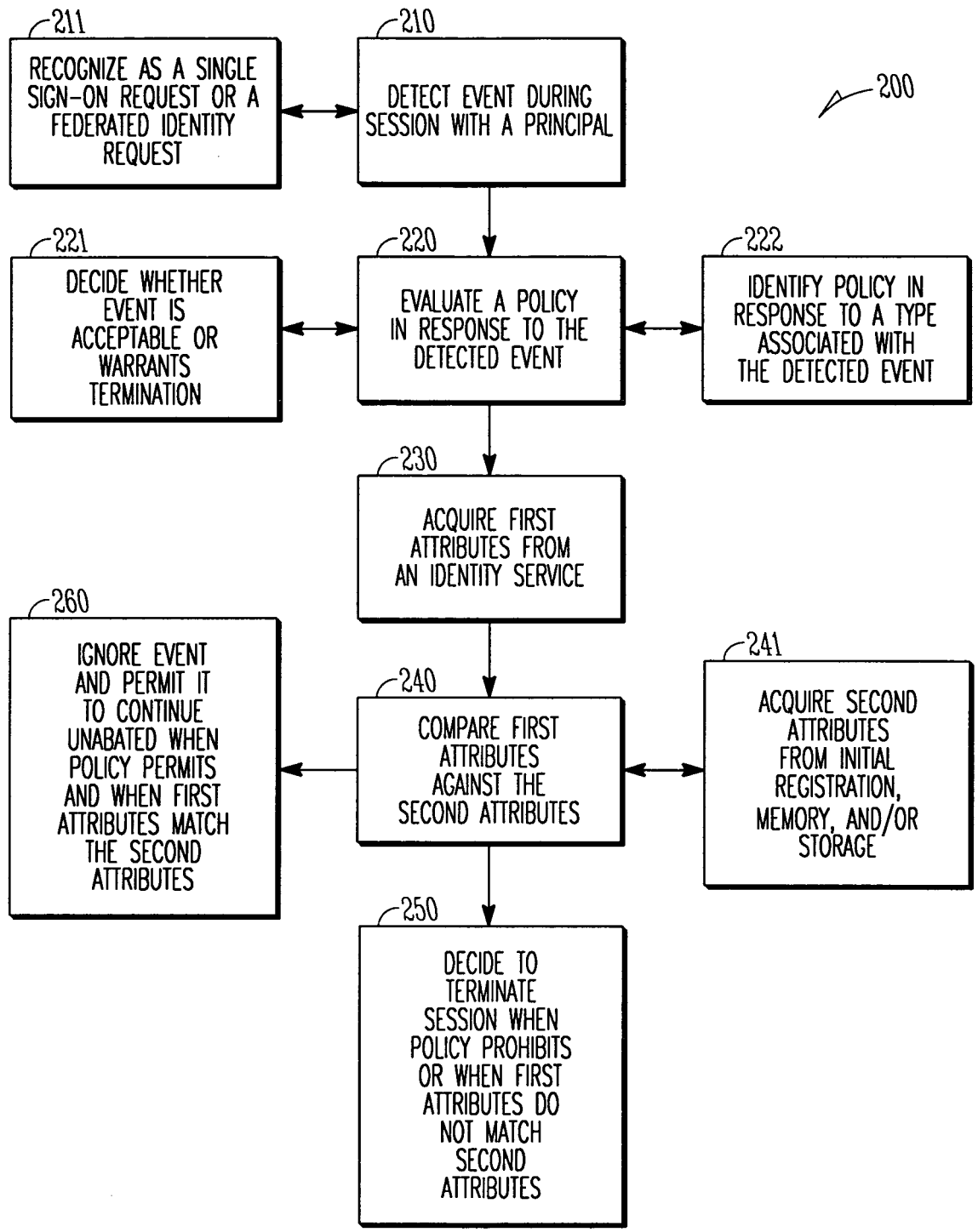
FIG. 2 is a diagram of another method for validating an identity for a principal, according to an example embodiment.

FIG. 2 is a diagram of another method 200 for validating an identity for a principal, according to an example embodiment. The method 200 (hereinafter "monitor service" is implemented in a machine-accessible and readable medium and is operational over a network. The network may be wired, wireless, or a combination of wired and wireless. The monitor service is presented as an alternative perspective to the validation service and highlights in greater detail some features of the validation service in greater detail.

Initially, a principal has gained authenticated access to the monitor service. This can occur in the manners discussed above with respect to the validation service represented by the method 100 of the FIG. 1. As the principal performs operations during that access (referred to as a "session"), the monitor service watches or listens to decide whether special actions are warranted.

Accordingly, at 210, the monitor service detects an event during a session with a principal. In an embodiment, at 211, the monitor service may recognize the event as a single sign-on request or any other federated identity type request. That is, the event is raised or issued when the principal attempts to perform some federation of the identity with which the principal is currently operating under within the session. For example, if the principal is permitted to create an identity for a sub service, then this is aggregating identities associated with the principal and is considered one type of federation of identities.

At 220, the monitor service evaluates a policy in response to the detected event. In an embodiment, at 221, the monitor service may decide in response to that evaluation whether the event is acceptable or warrants immediate termination. In other words, the principal may be restricted from performing some operations, such as operations associated with identity federation and if the detected event within the policy instructs, the monitor service terminates the principal's session and corresponding access.

According to an embodiment, at 222, each event or event type may be used to identity a specific policy. The monitor service then dynamically and in real time evaluates and processes that policy.

At 230, the monitor service acquires first attributes about the principal from an identity service. A discussion of this technique was described above with respect to the validation service represented by the method 100 of the FIG. 1.

At 240, the monitor service compares the first attributes against second attributes. In an embodiment, at 241, the second attributes are acquired from an initial registration of the principal and/or from memory/storage. If the first attributes match the second attributes, then the monitor service is reasonable assured that the principal is who it purports to be.

At 250, the monitor service decides whether to terminate the session or permit it to proceed. The session is terminated if the evaluated policy dictates or if the first attributes did not match the second attributes. At 260, the event is ignored and the session is permitted to continue unabated when the policy permits and when the first attributes matched the second attributes. Termination may occur for a variety of additional reasons, such as a dropped connection between the monitor service and the identity service, such that the monitor service is unable to communicate with the identity service; specific dynamically evaluated policies may also dictate that the session be terminated. Therefore, the session may be terminated for a variety of additional and configurable situations.

Figure 3:
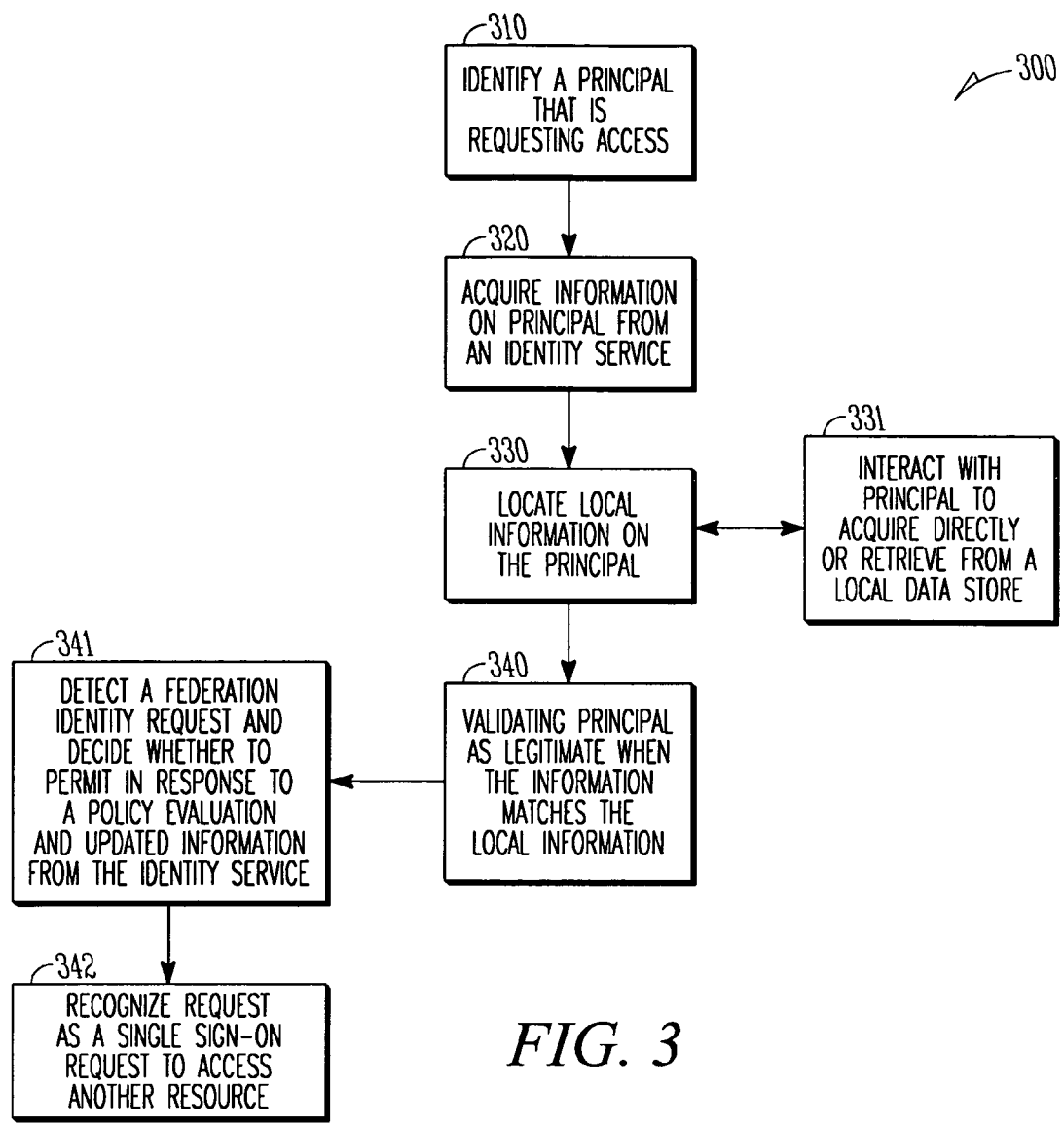
FIG. 3 is a diagram of a yet another method for validating an identity for a principal, according to an example embodiment.

FIG. 3 is a diagram of yet another method 300 for validating an identity for a principal, according to an example embodiment. The method 300 (hereinafter "proxy identity service") is implemented in a machine-accessible and readable medium and is accessible over a network. The network may be wired, wireless, or a combination of wired and wireless.

Again, the proxy identity service presents an alternative perspective to the validation service and the monitor service represented by the methods 100 and 200 of the FIGS. 1 and 2, respectively. In an embodiment, the proxy identity service is added as a front-end service to an existing service provider (SP). In some cases, the SP is not even aware of the existence of the proxy identity service. The proxy identity service processes to validate principal identities attempting to access the SP and can monitor actions taken to perform regular and continual validation against the principal identity. In an embodiment, the proxy identity service is a transparent proxy.

In still other situations, the proxy identity service may be at least partially integrated into an existing SP using an API. In these cases, the proxy identity service may be viewed as a forward or reverse proxy.

With this context, the processing of the proxy identity service is now described with reference to FIG. 3.

At 310, the proxy identity service identifies a principal that is requesting access to the SP. The principal is authenticated for access. Authentication may be achieved via an assertion or token being presented, where that assertion or token is from a trusted and known identity service associated with the proxy identity service and the SP. In some cases, policy may drive the proxy identity service to engage the principal to acquire some additional credentials, such as a password.

At 320, the proxy identity service acquires information on the principal from the identity service. The type of information is also driven by policy. Examples of the type of information were discussed above in the context of attributes, which are identifying information for the principal, and which the principal supplied to the identity service.

At 330, the proxy identity service locates local information on the principal. Examples of the type of local information was discussed above in the context of local attributes, which are managed and controlled locally by the validation service and the monitor service represented by the methods 100 and 200 of the FIGS. 1 and 2, respectively.

According to an embodiment, at 331, the proxy identity service may interact directly with the principal during an initial registration to acquire the local information about the principal. Thereafter, the local information is retrieved from a local data store (e.g., directory, file, database, repository, data warehouse, etc.).

At 340, the proxy identity service validates the principal as legitimate when the information (obtained from the identity service) matches the local information (obtained locally and independently by the proxy identity service). If the match is not achieved, then the proxy identity service determines something is not right with the principal and its identity and access to the SP is terminated and not granted.

In an embodiment, at 341, the proxy identity service also monitors a session associated with the principal and the SP. During this session, the proxy identity service looks for a federated identity request and if detected, a policy is evaluated to determine if this is permissible. Additionally, the identity service is consulted again in a dynamic and real-time fashion to acquired updated information on the principal. The session is allowed to continue if the policy permits the federated identity request being made by the principal within the session and if the updated information matches the local information.

In one situation, at 342, the federated identity request is recognized as a single sign-on request. That is, the principal is attempting to gain access to another different service or resource via the SP with the single sign-on request. Other types of federated identity requests may exist as well, such as, but not limited to, requests to create a new identity for the principal with respect to a resource, requests to modify an existing identity, and others.

Figure 4:
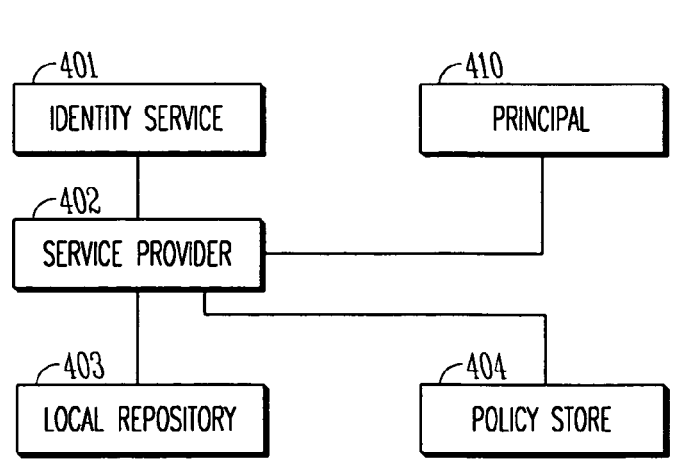
FIG. 4 is a diagram of an identity validation system, according to an example embodiment.

FIG. 4 is a diagram of an identity validation system 400, according to an example embodiment. The identity validation system 400 is implemented in a machine-accessible and readable medium and is accessible over a network. The network may be wired, wireless, or a combination of wired and wireless. The processing of the identity validation system 400 implements, among other things, the processing of methods 100, 200, and/or 300 depicted in the FIGS. 1-3, respectively.

The identity validation system 400 includes an identity service 401 and a service provider (SP) 402. In some embodiments, the identity validation system 400 may also include a local repository 403 and/or a policy store 404. The identity service 401 and the SP 402 interact with a principal 410. Each of these and their interactions with one another will now be discussed in greater detail.

The identity service 401 may be viewed as a type of single sign-on service. Some example identity services 401 were presented above and incorporated by reference above. According to an embodiment, an existing identity service 401 is enhanced to provide the interaction discussed herein.

The identity service 401 authenticates the principal 410 and manages various identities of the principal 410. The principal 410 acquires an identity for accessing the SP 402. That identity may not be the true identity of the principal 410; rather, the identity is one recognized and used by the SP 402. The identity service 401 also supplies credentialing information, a token, and/or an assertion, which the principal 410 may use to gain authentication to the SP 402.

It is to be noted that although reference is made to a single principal 410 herein that the identity validation system 400 operates simultaneously on a plurality of principals 410.

The SP 402 is configured to interact with a principal 410 requesting access to local and external services of the SP 402. To do this the SP 402 first assures itself that the principal 410 is legitimate. This can be done via the credential information supplied by the identity service 401 or it can be done via a password being directly supplied by the principal 410.

During a first access or registration, the SP 402 initially acquires attributes for the principal 410. These initially acquired attributes are retained by the SP 402 and are used to perform additional checks against a principal's identity for each subsequent access and during sessions that the principal 410 may subsequently have with the SP 402.

The SP 402 also regularly and in real time consults the identity service 401 to acquire updated attributes for the principal 410. These updated attributes are compared against the initially acquired attributes to determine if access is to be granted or terminated at any particular point in time.

Example processing associated with the SP 402 was presented in detail above with respect to the validation service, the monitor service, and the proxy identity service represented by the methods 100-300 of the FIGS. 1-3, respectively.

According to an embodiment, the identity validation system 400 also includes a local repository 403 to house and to retrieve the initially acquired attributes. The repository 403 may be directory, a database, a warehouse, a file, and the like.

In an embodiment, the identity validation system 400 also includes a policy store 404. The policy store 404 is used for housing policies for events detected during sessions between the SP 402 and the principals 410. Event types or identifiers may be indexed into the policy store 404 for purposes of acquiring specific policies to evaluate and enforce for detected events.

In fact, a variety of policies may drive the SP 402. For example, a policy 402 may drive the attributes acquired from the identity service 401. Another policy may drive how the principal 410 is to be initially authenticated. In other words, if a password is required for access even with a single sign-on token or other credential. Still another policy may determine whether access of the principal 410 is to be terminated in response to a detected event, such as a single sign-on attempt or other federated identity type of operation.

According to an embodiment, the SP 402 is implemented as a proxy service to an existing service that the principal 410 desires access to. In one situation, the proxy is a transparent proxy, such that the service is unaware of the existence and operations being performed on its behalf by the SP 402.

The above description is illustrative, and not restrictive. Many other embodiments will be apparent to those of skill in the art upon reviewing the above description. The scope of embodiments should therefore be determined with reference to the appended claims, along with the full scope of equivalents to which such claims are entitled.

The Abstract is provided to comply with 37 C.F.R. §1.72(b) and will allow the reader to quickly ascertain the nature and gist of the technical disclosure. It is submitted with the understanding that it will not be used to interpret or limit the scope or meaning of the claims.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus the following claims are hereby incorporated into the Description of the Embodiments, with each claim standing on its own as a separate exemplary embodiment.

The invention claimed is:

1. A machine-implemented method to execute on a machine, comprising:
   receiving, by the machine, a sign-on token from a principal;
   requesting, by the machine, first principal attributes from an identity service, types for the attributes and the attributes are defined by a specific policy that is evaluated and the attributes include identifying information for the principal, the identity service manages and supplies authentication services over a network for the principal and the first principal attributes previously provided to the identity service by the principal when the principal authenticated to the identity service for single sign on service;

acquiring, by the machine, second principal attributes from the principal when the principal is making a first access attempt of the method and on subsequent accesses the second principal attributes are acquired from a repository on behalf of the principal without requiring interaction with the principal;

validating, by the machine, the principal for access when the first principal attributes selectively match the second principal attributes based on a policy that drives selective comparisons between the first principal attributes and the second principal attributes, an independent assessment of the principal is performed via the selective match even when the principal is authenticated for initial access pursuant to the sign-on token, the subsequent accesses requiring no interaction with the principal to perform the independent assessment detecting, by the machine, an event defined by a second policy during principal access; requesting, by the machine, an updated version of the first principal attributes from the identity service based on an event type for the event; and terminating, by the machine, the principal access when the updated version does not match the second principal attributes.

2. The method of claim 1, wherein acquiring further includes obtaining the second principal attributes directly from the principal when the sign-on token represents a first access attempt by the principal.

3. The method of claim 1, wherein requesting further includes requesting the first principal attributes in response to another policy.

4. The method of claim 1, wherein detecting further includes identifying the event as at least one of an attempt by the principal to access a sensitive resource and an attempt by the principal to acquire single sign-on status for purposes of accessing a different service.

5. A machine-implemented method to execute on a machine, comprising:

detecting, by the machine, an event during a session with a principal the event detected based on evaluation of a policy and is detected as a federated identity request made by the principal;

evaluating, by the machine, a second policy in response to the event the second policy resolved based on an event type for the event;

acquiring, by the machine, first attributes from an identity service based on the second policy that defines types of attributes and the attributes defining indentifying information for the principal, the first attributes previously supplied to the identity service, which provides authentication services, when the principal authenticated to the identity service for single sign-on;

selectively comparing based on the policy, by the machine, the first attributes against second attributes, the second attributes separately supplied by the principal during a first access to the method by the principal and the second attributes to further authenticate the principal during the session and the second attributes retained for subsequent access attempts to the method by the principal after the first access, the subsequent access requiring no interaction with the principal to perform an independent assessment of the first attributes against the second attributes; and deciding, by the machine, to terminate the session when the policy prohibits or when the first attributes do not match to and are not the same as the second attributes, an independent assessment of the principal is performed via the match of the first attributes to the second attributes even when the principal is authenticated for initial access to the single sign-on.

6. The method of claim 5, wherein detecting further includes recognizing the event as at least one of a single sign-on request by the principal to access another service, and an attempt by the principal to access a restricted resource.

7. The method of claim 5, wherein evaluating further includes deciding whether the event warrants terminating the session of the principal or whether the event is acceptable.

8. The method of claim 5 further comprising, ignoring, by the machine, the event and permitting the session to continue unabated when the policy permits and when the first attributes match the second attributes.

* * * * *

UNITED STATES PATENT AND TRADEMARK OFFICE
CERTIFICATE OF CORRECTION

Page 1 of 1

PATENT NO. : 8,069,476 B2
APPLICATION NO. : 11/444945
DATED : November 29, 2011
INVENTOR(S) : Stephen Hugh Kinser, Lloyd Leon Burch and Cameron Craig Morris It is certified that error appears in the above-identified patent and that said Letters Patent is hereby corrected as shown below:

On the Title Page

In the Assignee Item (73) section:

Delete "Novell, Inc." and insert --Oracle International Corporation--

Signed and Sealed this
Sixteenth Day of December, 2014

Michelle K. Lee
*Deputy Director of the United States Patent and Trademark Office*